United States Patent
Kim et al.

(10) Patent No.: US 9,491,650 B2
(45) Date of Patent: Nov. 8, 2016

(54) METHOD FOR REPORTING CHANNEL STATE INFORMATION IN A MULTI-CELL COOPERATIVE WIRELESS COMMUNICATION SYSTEM, AND APPARATUS THEREFOR

(75) Inventors: Kijun Kim, Anyang-si (KR); Hanbyul Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 570 days.

(21) Appl. No.: 14/000,680

(22) PCT Filed: Jan. 30, 2012

(86) PCT No.: PCT/KR2012/000700
§ 371 (c)(1),
(2), (4) Date: Aug. 21, 2013

(87) PCT Pub. No.: WO2012/128465
PCT Pub. Date: Sep. 27, 2012

(65) Prior Publication Data
US 2013/0324109 A1    Dec. 5, 2013

Related U.S. Application Data

(60) Provisional application No. 61/466,903, filed on Mar. 23, 2011.

(51) Int. Cl.
*G01R 31/08* (2006.01)
*H04W 24/10* (2009.01)
(Continued)

(52) U.S. Cl.
CPC ............ *H04W 24/10* (2013.01); *H04B 7/024* (2013.01); *H04B 7/0417* (2013.01);
(Continued)

(58) Field of Classification Search
USPC ....................................................... 455/517
See application file for complete search history.

(56) References Cited

U.S. PATENT DOCUMENTS

| 2010/0035555 | A1* | 2/2010 | Bala ....................... H04B 7/024 455/63.1 |
| 2010/0202308 | A1* | 8/2010 | Gorokhov ............ H04B 7/0417 370/252 |

(Continued)

FOREIGN PATENT DOCUMENTS

WO    2010120024 A1    10/2010

OTHER PUBLICATIONS

R1-110269, "Performance Evaluation of Intrasite Coordinated Beamforming," 3GPP TSG RAN WG1 Meeting #63bis, Jan. 21, 2011, See Section 2.

(Continued)

*Primary Examiner* — Duc C Ho
(74) *Attorney, Agent, or Firm* — Dentons US LLP

(57) ABSTRACT

The present invention relates to a method for a terminal to transmit channel state information in a multi-cell cooperative wireless communication system. Particularly, the method comprises the steps of: determining a precoding matrix index (PMI) for a serving cell from among a plurality of PMIs; structuring PMI information for a cooperative cell based on the PMI for the serving cell; and transmitting the PMI for the serving cell and the PMI information for the cooperative cell to the serving cell, wherein a plurality of the PMIs are divided into a plurality of PMI subsets, PMIs included by the respective PMI subsets are vertically placed, and the PMI information for the cooperative cell comprises a first indicator indicating at least one of a plurality of the PMI subsets to a PMI subset for the cooperative cell, and a second indicator indicating at least one of the PMIs in the indicated PMI subset to the PMI for the cooperative cell.

12 Claims, 10 Drawing Sheets

(51) Int. Cl.
    *H04L 1/00*    (2006.01)
    *H04B 7/02*    (2006.01)
    *H04B 7/04*    (2006.01)
    *H04L 1/16*    (2006.01)
    *H04B 7/06*    (2006.01)
    *H04L 1/06*    (2006.01)

(52) U.S. Cl.
    CPC ......... *H04B 7/0639* (2013.01); *H04L 1/0026* (2013.01); *H04L 1/0028* (2013.01); *H04L 1/1671* (2013.01); *H04B 7/0636* (2013.01); *H04L 1/06* (2013.01)

(56) References Cited

U.S. PATENT DOCUMENTS

2010/0271968 A1   10/2010   Liu et al.
2010/0322176 A1   12/2010   Chen et al.

OTHER PUBLICATIONS

Alcatel-Lucent: "UE PMI feedback signaling for user pairing/coordination", 3GPP Draft; R1-090777_Feedback_SIG_for_PREC_V06, 3rd Generation Partnership Project (3GPP), Mobile Competence Centre; 650, Route Des Lucioles; F-06921 Sophia-Antipolis Cedex; France, No. Athens, Greece; Feb. 3, 2009, XP050318635.

Research In Motion et al: "Companion Subset Based PMI/CQI Feedback for LTE-A MU-MIMO", 3GPP Draft; R1-104058(Rimcompanion Subset Based Feedback for MU-MIMO), 3rd Generation Partnership Project (3GPP), Mobile Competence Centre; 650, Route Des Lucioles; F-06921 Sophia-Antipolis Cedex; France, vol. RAN WG1, No. Dresden, Germany; Jun. 28, 2010, Jun. 22, 2010, XP050449367.

\* cited by examiner

FIG. 1     --Prior art--
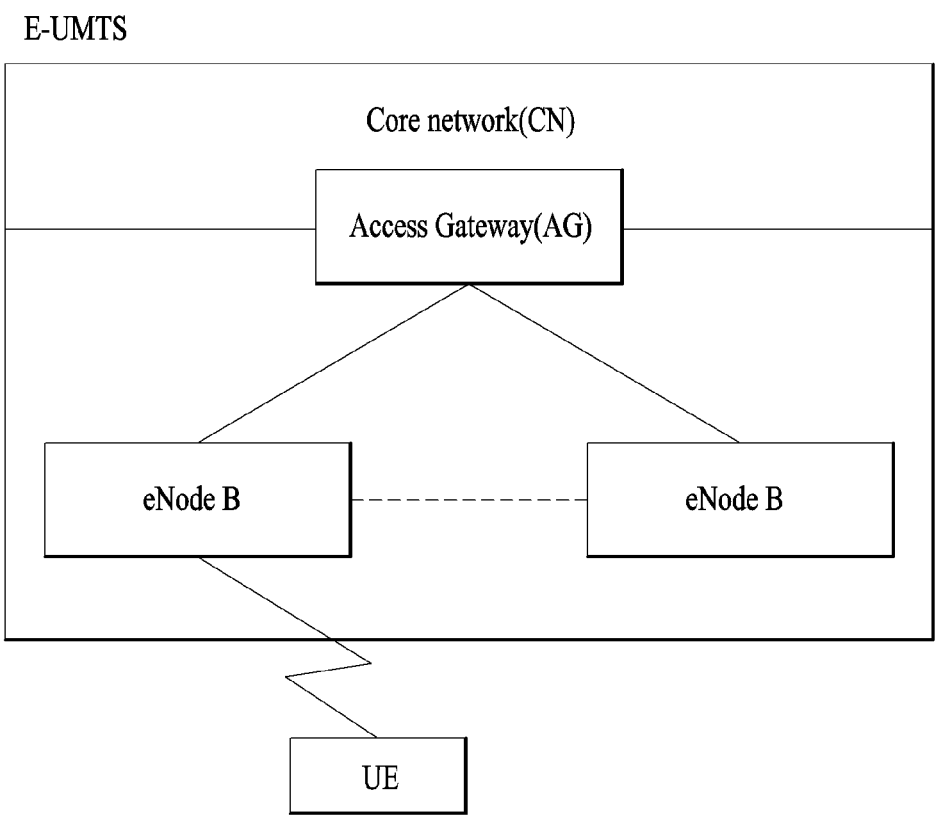

FIG. 2        --Prior art--
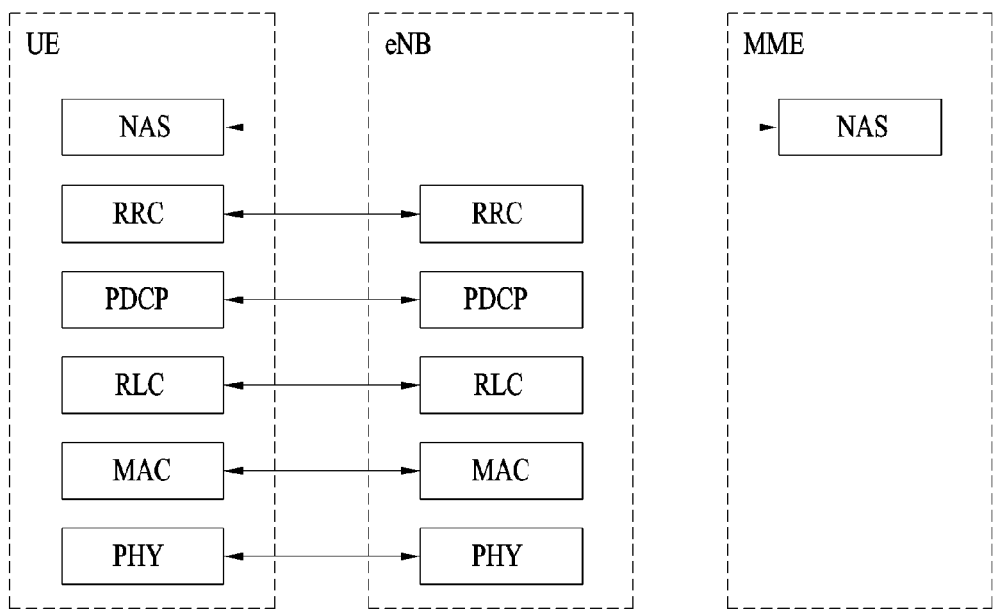
(a) control - plane protocol stack
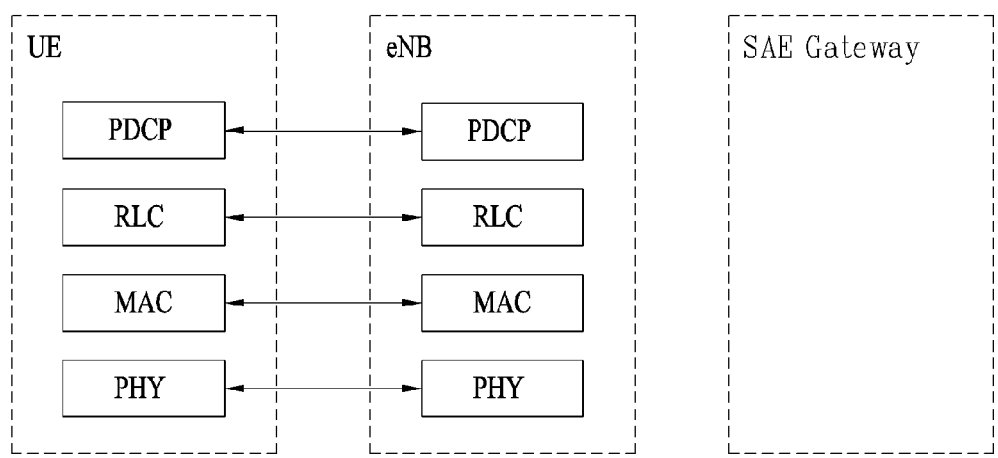
(b) user - plane protocol stack

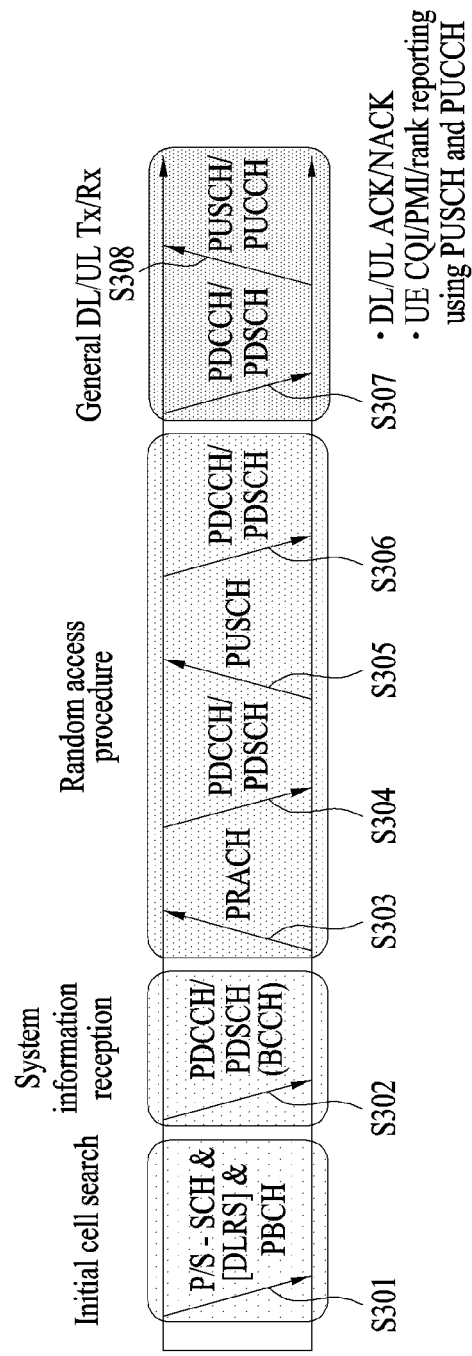

FIG. 4 —Prior art—
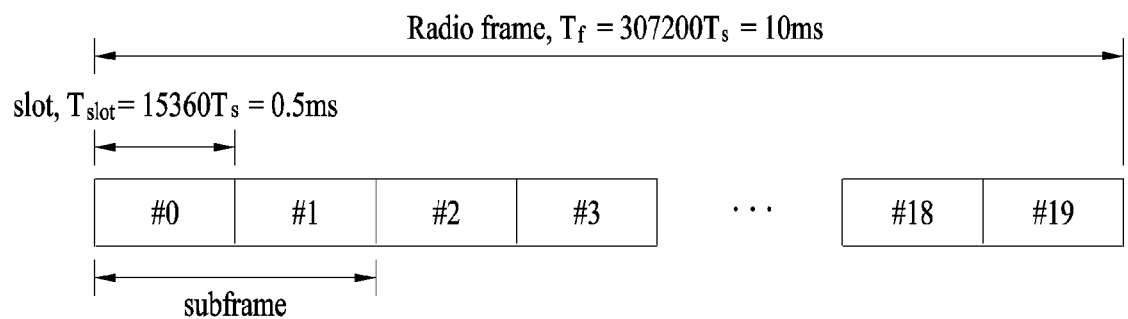

FIG. 5 --Prior art--
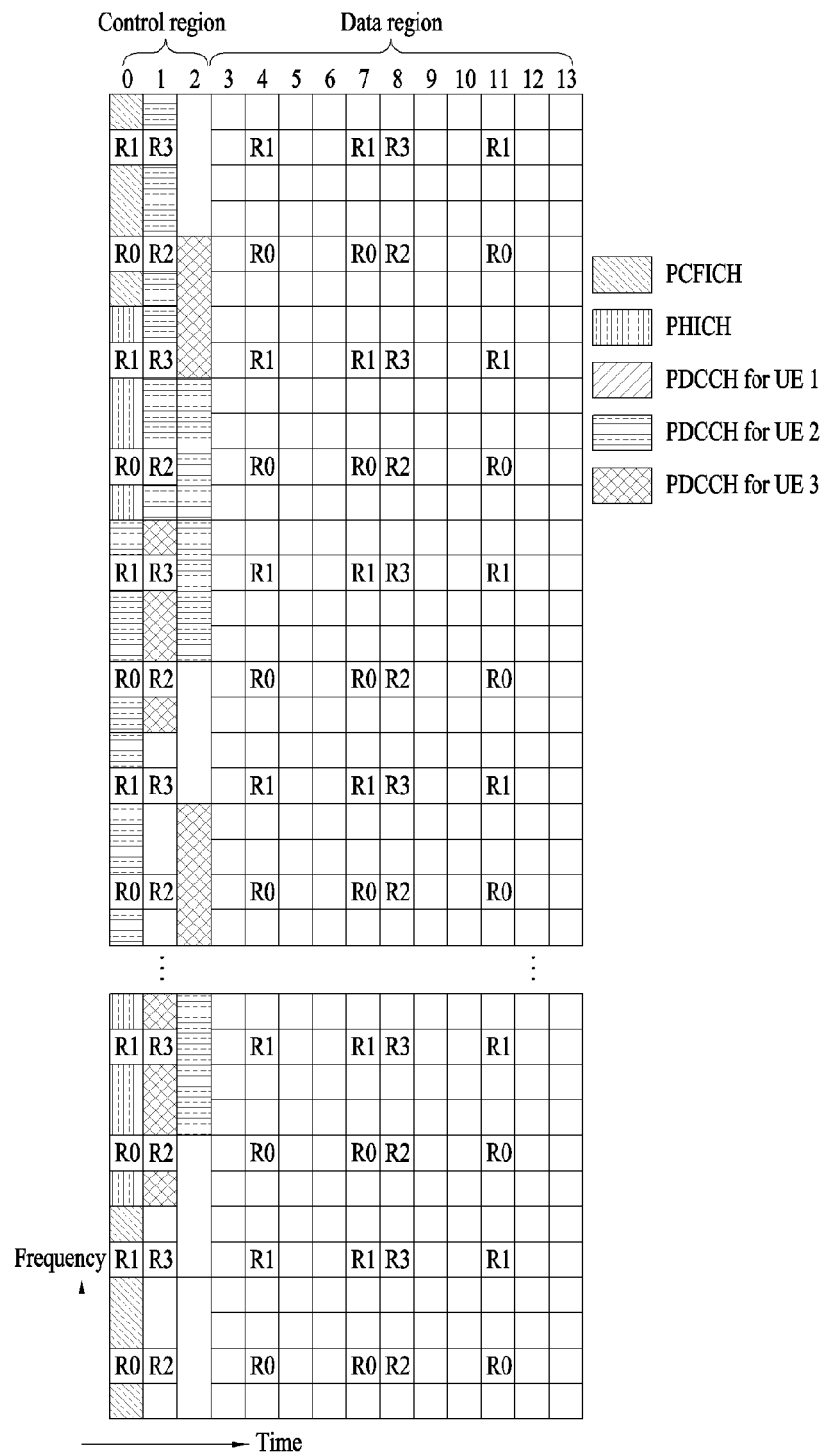

FIG. 6 --Prior art--
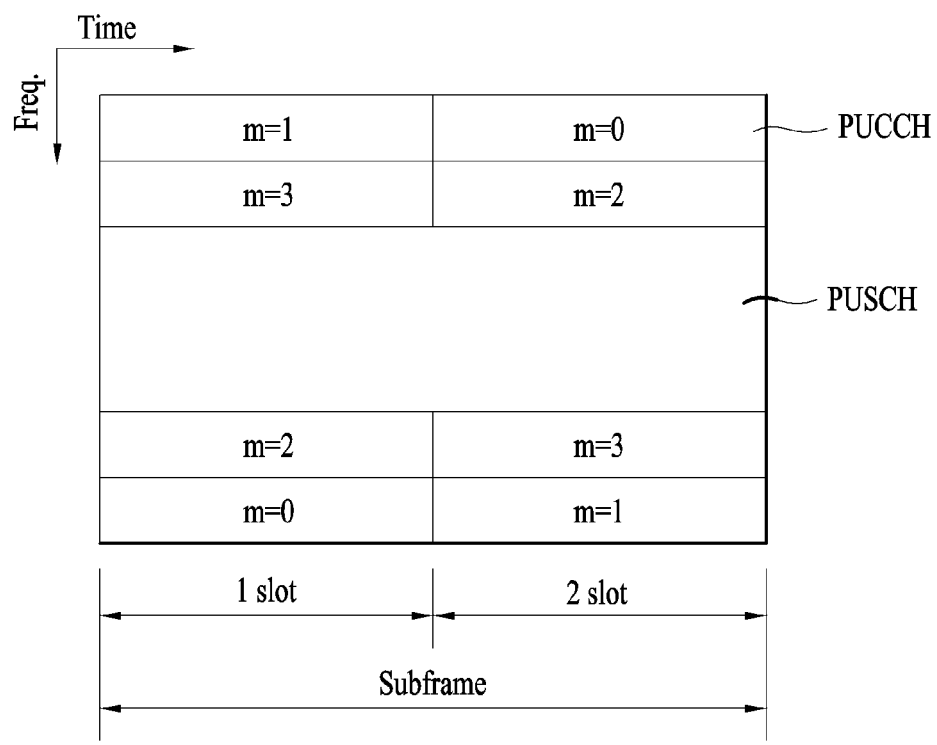

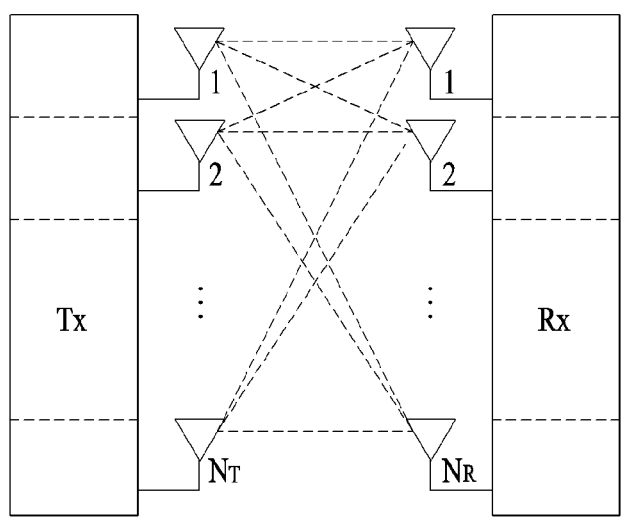
FIG. 7  --Prior art--

FIG. 8 --Prior art--
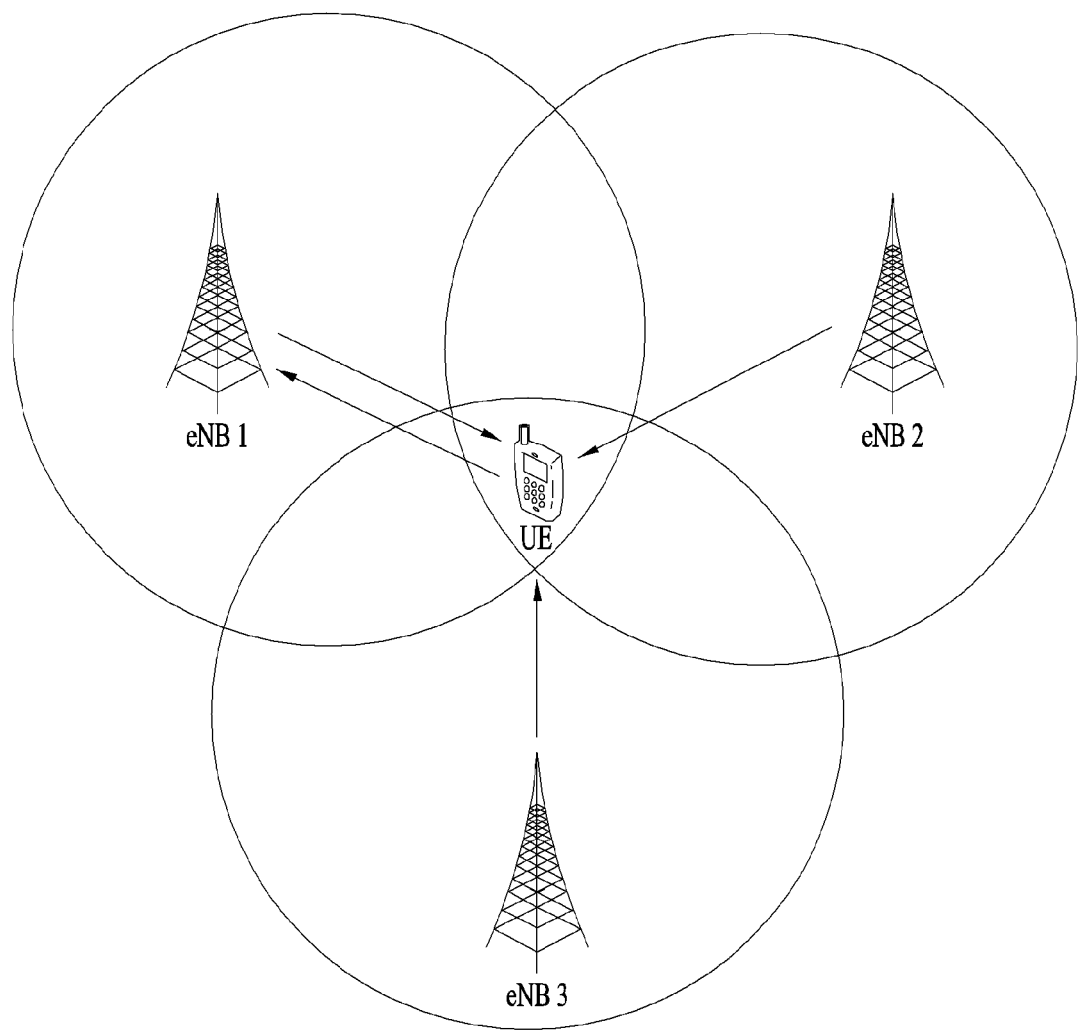

METHOD FOR REPORTING CHANNEL STATE INFORMATION IN A MULTI-CELL COOPERATIVE WIRELESS COMMUNICATION SYSTEM, AND APPARATUS THEREFOR

This application is a 35 USC §371 National Stage entry of International Application No. PCT/KR2012/000700 filed on Jan. 30, 2012, and claims priority of U.S. Provisional Application No. 61/466,903 filed on Mar. 23, 2011, which is hereby incorporated by reference in its entirety.

TECHNICAL FIELD

The present invention relates to a wireless communication system, and more particularly, to a method of reporting channel state information in a multi-cell cooperative wireless communication system and an apparatus therefore.

BACKGROUND ART

3GPP LTE ($3^{rd}$ generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "$3^{rd}$ generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE OF THE INVENTION

Technical Task

Accordingly, the present invention intends to propose a method of reporting channel state information in a multi-cell cooperative wireless communication system and apparatus therefore in the following description based on the discussion as mentioned in the foregoing description.

Technical Solution

To achieve these and other advantages and in accordance with the purpose of the present invention, as embodied and broadly described, according to one embodiment, a method transmitting channel state information, which is transmitted by a user equipment in a multi-cell cooperative wireless communication system includes the steps of determining a PMI for a serving cell among a plurality of Precoding Matrix Indexes (PMIs), constructing a PMI information for a cooperative cell based on the PMI for the serving cell, and transmitting the PMI for the serving cell and the PMI information for the cooperative cell to the serving cell, wherein a plurality of the PMIs are distinguished by a plurality of PMI subsets, wherein PMIs contained in each of a plurality of the PMI subsets are orthogonal to each other, wherein the PMI information for the cooperative cell comprises a first indicator indicating one of a plurality of the PMI subsets as a PMI subset for the cooperative cell and a second indicator indicating at least one of PMIs in the indicated PMI subnet as a PMI for the cooperative cell.

Meanwhile, to further achieve these and other advantages and in accordance with the purpose of the present invention, according to a different embodiment, a user equipment in a multi-cell cooperative wireless communication system includes a processor configured to determine a PMI for a serving cell among a plurality of Precoding Matrix Indexes (PMIs) and configured to construct a PMI information for a cooperative cell based on the PMI for the serving cell and a transmitting module configured to transmit the PMI for the serving cell and the PMI information for the cooperative cell to the serving cell, wherein a plurality of the PMIs are distinguished by a plurality of PMI subsets, wherein PMIs contained in each of a plurality of the PMI subsets are orthogonal to each other, wherein the PMI information for the cooperative cell comprises a first indicator indicating one of a plurality of the PMI subsets as a PMI subset for the cooperative cell and a second indicator indicating at least one of PMIs in the indicated PMI subnet as a PMI for the cooperative cell.

In this case, the PMI for the cooperative cell determines the PMI subset for the cooperative cell, determines a second CQI index under an assumption that there exist a random interference from the cooperative cell while a signal is transmitted by the serving cell using the PMI for the serving cell, and determined in the PMI subset using the first CQI index and a preset threshold value (Δ).

In this case, the PMI for the cooperative cell satisfies a following Formula 1.

The first CQI index−$CQI_i$≤Δ  <Formula 1>

(In this case, the $CQI_i$ is a CQI index, if it is assumed that the cooperative cell transmits a signal using a $PMI_i$ in the PMI subnet.)

Or, the PMI for the cooperative cell determines the PMI subset for the cooperative cell, determines a second CQI index under an assumption that there exist a random interference from the cooperative cell while a signal is transmitted by the serving cell using the PMI for the serving cell, and determined in the PMI subset using the first CQI index and a preset threshold value (Δ).

In this case, the PMI for the cooperative cell satisfies a following Formula 2.

$CQI_i$−the second CQI index≥Δ  <Formula 2>

(In this case, the $CQI_i$ is a CQI index, if it is assumed that the cooperative cell transmits a signal using a $PMI_i$ in the PMI subnet.)

Preferably, the threshold value (Δ) is set via an upper layer signal from the serving cell.

Advantageous Effects

According to embodiments of the present invention, channel state information can be more efficiently transmitted in a multi-cell cooperative wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

FIG. 1 is a schematic diagram of E-UMTS network structure as one example of a wireless communication system;

FIG. 2 is a diagram for structures of control and user planes of radio interface protocol between a 3GPP radio access network standard-based user equipment and E-UTRAN;

FIG. 3 is a diagram for explaining physical channels used for 3GPP system and a general signal transmission method using the physical channels;

FIG. 4 is a diagram for a structure of a radio frame in LTE system;

FIG. 5 is a diagram for a structure of a downlink radio frame in LTE system;

FIG. 6 is a diagram for a structure of an uplink subframe used in LTE system;

FIG. 7 is a block diagram of a general multi-antenna (MIMO) communication system;

FIG. 8 is a diagram of a CoMP transmission method supported by LTE-A system;

BEST MODE

Mode for Invention

Figure 9:
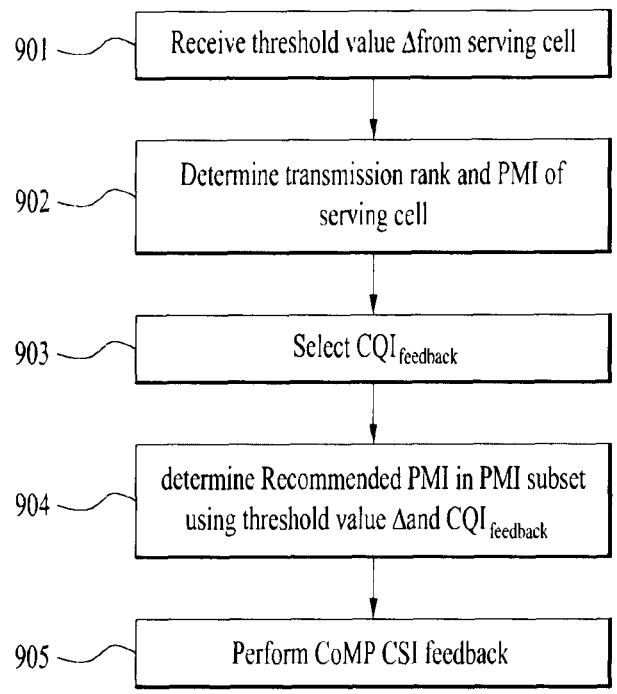
FIG. 9 is a flowchart for a UE to report channel state information according to a first embodiment of the present invention.

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention can be applied to H-FDD or TDD in a manner of being easily modified.

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a $1^{st}$ layer, provides higher layers with an information transfer service using a physical channel. The physical layer is connected to a medium access control layer situated above via a transport channel. Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a $2^{nd}$ layer provides a service to a radio link control (hereinafter abbreviated RLC) layer, which is a higher layer, on a logical channel. The RLC layer of the $2^{nd}$ layer supports a reliable data transmission. The function of the RLC layer may be implemented by a function block within the MAC. PDCP (packet data convergence protocol) layer of the $2^{nd}$ layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a $3^{rd}$ layer is defined on a control plane only. The RRC layer is responsible for control of logical channels, transport channels and physical channels in association with a configuration, a re-configuration and a release of radio bearers (hereinafter abbreviated RBs). The RB indicates a service provided by the $2^{nd}$ layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may be then able to obtain information such as a cell ID and the like. Subsequently, the user equipment receives a physical broadcast channel from the eNode B and may be then able to obtain intra-cell broadcast information. Meanwhile, the user equipment receives a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain detailed system information [S302].

Meanwhile, if a user equipment initially accesses an eNode B or does not have a radio resource for transmitting a signal, the user equipment may be able to perform a random access procedure (RACH) to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

FIG. 4 is a diagram for a structure of a radio frame used in an LTE system.

Referring to FIG. 4, one radio frame has a length of 10 ms $(327,200 \times T_s)$ and is constructed with 10 subframes in equal size. Each of the subframes has a length of 1 ms and is constructed with two slots. Each of the slots has a length of 0.5 ms $(15,360 \times T_s)$. In this case, $T_s$ indicates a sampling time and is represented as $T_s = 1/(15 \text{ kHz} \times 2048) = 3.2552 \times 10^{-8}$ (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

FIG. 5 is a diagram for showing an example of a control channel included in a control region of a single subframe in a DL radio frame.

Referring to FIG. 5, a subframe consists of 14 OFDM symbols. According to a subframe configuration, the first 1 to 3 OFDM symbols are used for a control region and the other 13~11 OFDM symbols are used for a data region. In the diagram, R1 to R4 may indicate a reference signal (hereinafter abbreviated RS or a pilot signal) for an antenna 0 to 3. The RS is fixed as a constant pattern in the subframe irrespective of the control region and the data region. The control channel is allocated to a resource to which the RS is not allocated in the control region and a traffic channel is also allocated to a resource to which the RS is not allocated in the data region. The control channel allocated to the control region may include a physical control format indicator channel (PCFICH), a physical hybrid-ARQ indicator channel (PHICH), a physical downlink control channel (PDCCH) and the like.

The PCFICH is a physical control format indicator channel and informs a user equipment of the number of OFDM symbols used for the PDCCH on every subframe. The PCFICH is situated at the first OFDM symbol and is configured prior to the PHICH and the PDCCH. The PCFICH consists of 4 resource element groups (REG) and each of the REGs is distributed in the control region based on a cell ID (cell identity). One REG consists of 4 resource elements (RE). The RE may indicate a minimum physical resource defined as 'one subcarrier×one OFDM symbol'. The value of the PCFICH may indicate the value of 1 to 3 or 2 to 4 according to a bandwidth and is modulated into a QPSK (quadrature phase shift keying).

The PHICH is a physical HARQ (hybrid-automatic repeat and request) indicator channel and used for carrying HARQ ACK/NACK for an UL transmission. In particular, the PHICH indicates a channel to which DL ACK/NACK information is transmitted for UL HARQ. The PHICH consists of a single REG and is scrambled cell-specifically. The ACK/NACK is indicated by 1 bit and modulated into BPSK (binary phase shift keying). The modulated ACK/NACK is spread into a spread factor (SF) 2 or 4. A plurality of PHICHs, which are mapped to a same resource, composes a PHICH group. The number of PHICH, which is multiplexed by the PHICH group, is determined according to the number of spreading code. The PHICH (group) is repeated three times to obtain diversity gain in a frequency domain and/or a time domain.

The PDCCH is a physical DL control channel and is allocated to the first n OFDM symbol of a subframe. In this case, the n is an integer more than 1 and indicated by the PCFICH. The PDCCH consists of at least one CCE. The PDCCH informs each of user equipments or a user equipment group of an information on a resource assignment of PCH (paging channel) and DL-SCH (downlink-shared channel), which are transmission channels, an uplink scheduling grant, HARQ information and the like. The PCH (paging channel) and the DL-SCH (downlink-shared channel) are transmitted on the PDSCH. Hence, an eNode B and the user equipment transmit and receive data via the PDSCH in general except a specific control information or a specific service data.

Information on where the data of the PDSCH is transmitted to which user equipment (one or a plurality of user equipments) and the information on how to receive and decode the PDSCH data by the user equipments and the like are transmitted in a manner of being included in the PDCCH. For instance, assume that a specific PDCCH is CRC masked with an RNTI (radio network temporary identity) called "A" and an information on data transmitted using a radio resource (e.g., frequency position) called "B" and a DCI format i.e., a transmission form information (e.g., a transmission block size, a modulation scheme, coding information, and the like) called "C" is transmitted via a specific subframe. In this case, the user equipment in a cell monitors the PDCCH using the RNTI information of its own, if there exist at least one or more user equipments having the "A" RNTI, the user equipments receive the PDCCH and the PDSCH, which is indicated by the "B" and the "C", via the received information on the PDCCH.

FIG. 6 is a diagram for a structure of an uplink subframe used in LTE system.

Referring to FIG. 6, an UL subframe can be divided into a region to which a physical uplink control channel (PUCCH) carrying control information is assigned and a region to which a physical uplink shared channel (PUSCH) carrying a user data is assigned. A middle part of the subframe is assigned to the PUSCH and both sides of a data region are assigned to the PUCCH in a frequency domain. The control information transmitted on the PUCCH includes an ACK/NACK used for HARQ, a CQI (channel quality indicator) indicating a DL channel status, an RI (rank indicator) for MIMO, an SR (scheduling request) corresponding to an UL resource request, and the like. The PUCCH for a single UE uses one resource block, which occupies different frequencies in each slot within a subframe. In particular, 2 resource blocks assigned to the PUCCH are frequency hopped on a slot boundary. In particular, FIG. 6 shows an example that the PUCCH satisfying conditions (e.g., m=0, 1, 2, 3) is assigned to a subframe.

In the following description, MIMO system is explained. The MIMO (multiple-input multiple-output) is a method using a plurality of transmitting antennas and a plurality of receiving antennas. The efficiency in transmitting and receiving data may be enhanced by the MIMO. In particular, by using a plurality of the antennas at a transmitting end or a receiving end in a radio communication system, it may be able to increase a capacity and enhance performance. In the following description, the MIMO may be called a 'multi-antenna'.

In the multiple antenna technology, it may not depend on a single antenna path to receive a whole message. Data is completed in a manner of combining data fragments received from many antennas in one place in the multiple antenna technology instead. When the multiple antenna technology is used, a data transmission speed may be enhanced in a cell area having a specific size or a system coverage may be enlarged while a specific data transmission speed is secured. And, this technology is widely used in a mobile communication terminal, a relay station, and the like. According to the multiple antenna technology, a throughput limitation of a single antenna used by a conventional technology in a mobile communication can be overcome.

A block diagram of a general multi-antenna communication system is depicted in FIG. 7. $N_T$ number of transmitting antenna is installed in a transmitting end and $N_R$ number of receiving antenna is installed in a receiving end. As described in the above, in case that both the transmitting end and the receiving end use plural number of antennas, a theoretical channel transmission capacity is increased compared to a case that the plural number of antennas are only used for either the transmitting end or the receiving end. The increase of the channel transmission capacity is proportional to the number of antenna. Thus, a transfer rate is enhanced and frequency efficiency is enhanced. If a maximum transfer rate is represented as $R_o$ in case of using a single antenna, the transfer rate using multiple antennas can be theoretically increased as much as the maximum transfer rate $R_o$ multiplied by a rate of increase $R_i$, as shown in the following Formula 1. In this case, the $R_i$ is a smaller value of the $N_T$ and the $N_R$.

$$R_i = \min(N_T, N_R) \qquad \text{[Formula 1]}$$

For instance, MIMO communication system using 4 transmitting antennas and 4 receiving antennas may be able to theoretically obtain the transfer rate of 4 times of a single antenna system. After the theoretical capacity increase of the multi-antenna system is proved in the mid-90s, various technologies for practically enhancing a data transmission rate have been actively studied up to date and several technologies among them are already reflected in such a various wireless communication standard as a $3^{rd}$ generation mobile communication, a next generation wireless LAN and the like.

If we look at the research trend related to the multi-antenna until now, many active researches have been performed for such a study of various points of view as a study on information theory related to a multi-antenna communication capacity calculation in various channel environments and multiple access environment, a study on a radio channel measurement and model deduction of the multi-antenna system, a study on a space-time signal processing technology for enhancing a transmission reliability and a transmission rate, and the like.

In case of mathematically modeling a communication method of the multi-antenna system in order to explain it with more specific way, it can be represented as follows. As shown in FIG. 7, assume that there exist $N_T$ number of transmitting antenna and $N_R$ number of receiving antenna. First of all, if we look into a transmission signal, since the maximum number of information capable of being transmitted is $N_T$ in case that there exists $N_T$ number of transmitting antenna, transmission information can be represented as a vector in the following Formula 2.

$$s = [s_1, s_2, \ldots, s_{N_T}]^T \quad \text{[Formula 2]}$$

Meanwhile, for each of the transmission informations $s_1$, $s_2, \ldots, s_{N_T}$, a transmit power may be differentiated according to the each of the transmission informations. In this case, if each of the transmit powers is represented as $P_1$, $P_2, \ldots, P_{N_T}$, transmit power-adjusted transmission information can be represented as a vector in the following Formula 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Formula 3]}$$

And, if ŝ is represented using a diagonal matrix P, it can be represented as a following Formula 4.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Formula 4]}$$

Meanwhile, let's consider a case that the $N_T$ number of transmission signal $x_1, x_2, \ldots, s_{N_T}$, which is practically transmitted, is configured in a manner of applying a weighted matrix \\ to the adjusted information vector ŝ. In this case, the weighted matrix performs a role of distributing the transmission information to each of the antennas according to the situation of the transmission channel and the like. The transmission signal $x_1, x_2, \ldots, x_{N_T}$ can be represented using a vector X in the following Formula 5. In this case, $W_{ij}$ means a weighting between an $i^{th}$ transmitting antenna and $j^{th}$ information. The \\ is called the weighted matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & & w_{iN_T} \\ \vdots & & \ddots & \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Formula 5]}$$

In general, a physical meaning of a rank of a channel matrix may indicate a maximum number capable of transmitting different information from each other in a given channel. Hence, since the rank of the channel matrix is defined by a minimum number of the numbers of row or column independent from each other, the rank of the matrix is configured not to be greater than the number of the row or the column. For instance, the rank of a channel matrix H (rank (H)) is limited as shown in Formula 6.

$$\text{rank}(H) \leq \min(N_T, N_R) \quad \text{[Formula 6]}$$

And, let's define each of the informations different from each other, which are transmitted using a multi-antenna technology, as a transport stream or simply a stream. The stream can be named a layer. Then, the number of the transport stream is naturally configured not to be greater than the rank of the channel, which is a maximum number capable of transmitting informations different from each other. Hence, the channel matrix H can be represented as Formula 7 in the following.

$$\text{\# of streams} \leq \text{rank}(H) \leq \min(N_T, N_R) \quad \text{[Formula 7]}$$

In this case, '# of streams' indicates the number of streams. Meanwhile, in this case, it should be cautious that one stream can be transmitted via more than one antenna.

Various methods making one or more streams correspond to many antennas may exist. These methods can be described in accordance with the kind of the multi-antenna technology in the following description. A case of transmitting one stream via many antennas may be called a space diversity scheme and a case of transmitting many streams via many antennas may be called a space multiplexing scheme. Naturally, a hybrid form of the space diversity and the space multiplexing is also available.

Meanwhile, it is expected that a LTE-A system, which is a standard of a next generation mobile communication system, will support a CoMP (coordinated multi point) transmission method, which is not supported by the conventional standard, to enhance a data transmission rate.

FIG. 8 is a diagram of a CoMP transmission method supported by LTE-A system.

Referring to FIG. 8, the CoMP transmission method is a transmission method for two or more base stations or cells to communicate with the user equipment in a manner of cooperating with each other to enhance a communication performance between the user equipment situated at a radio shadow zone and the base station (a cell or a sector).

The CoMP transmission method can be classified into a join processing (CoMP-joint processing, CoMP-JP) method in the form of a cooperative MIMO via data sharing and a coordinated scheduling/beamforming (CoMP-coordinated scheduling/beamforming, CoMP-CS/CB) method.

According to the joint processing (CoMP-JP) method in case of a DL, a user equipment may be able to instantaneously receive data simultaneously from each of the base stations performing the CoMP transmission method. And, a reception performance can be enhanced in a manner of combining the signals received from each of the base stations (Joint Transmission (JT)). And, it is also possible to consider a method of transmitting a data to the user equipment on a specific timing by one of the base stations performing the CoMP transmission method (Dynamic Point Selection (DPS)). On the other hand, according to the coordinated scheduling/beamforming method (CoMP-CS/CB), the user equipment may be able to instantaneously receive data from a single base station via a beamforming.

According to the joint processing (CoMP-JP) method in case of an UL, each of the base stations may be able to simultaneously receive PUSCH signal from the user equipment (Joint Reception (JR)). On the other hand, according to the coordinated scheduling/beamforming method (CoMP-CS/CB), only a single base station may be able to receive the PUSCH. In this case, the decision to use the coordinated scheduling/beamforming method is determined by the coordinating cells (or base stations).

In the following description, channel state information (CSI) report is explained. In a current LTE standard, there exist two types of transmission scheme, i.e., an open-loop MIMO operated without channel information and a closed-loop MIMO operated based on channel information. In particular, in the closed loop MIMO, each of a user equipment and an eNode B can perform a beamforming based on the channel state information to obtain a multiplexing gain of MIMO antenna. The eNode B transmits a reference signal to the user equipment to obtain channel state information from the user equipment and then commands the user equipment to feedback the channel state information measured based on the reference signal on Physical Uplink Control Channel (PUCCH) or Physical Uplink Shared Channel (PUSCH).

The CSI is mainly classified into an RI (rank indicator), a PMI (precoding matrix index), and a CQI (channel quality indication). First of all, as mentioned in the foregoing description, the RI indicates rank information of a channel and means the number of stream capable of being received by a user equipment via an identical frequency-time resource. And, since the RI is determined by a long term fading of a channel, the RI is feedback to an eNode B with a longer interval compared to the PMI and CQI value in general.

Secondly, the PMI is a value reflecting a spatial characteristic of a channel and indicates a UE's preferred precoding matrix index of an eNode B on the basis of such a metric as SINR, and the like. Lastly, the CQI is a value indicating strength of a channel and means a reception SINR capable of being received in case that an eNode B uses the PMI in general.

The UE severely interfered by neighboring cells in the coordinated scheduling/beamforming method enhances reception performance from a serving cell by reducing the interference from the neighboring cells in a manner of restricting a precoding matrix or a beamforming vector of the neighboring cells. As the previously proposed method for restricting the precoding matrix of the neighboring cell, there exists a method of giving a feedback on a Recommended PMI, which is preferable to be used by the neighboring cell, and a method of giving a feedback on a Worst PMI, which may occur worst interference in case that the neighboring cell uses it.

The method of giving a feedback on the Recommended PMI has a demerit for degrading the performance of the neighboring cell by reducing scheduling flexibility of the neighboring cell in case of giving a feedback on one PMI in consideration of a feedback overhead.

On the other hand, in case of giving a feedback on the Worst PMI, the neighboring cell constructs a transmission precoding matrix using only orthogonal matrices of the fed back precoding matrix and tries to minimize the interference to the corresponding UE using the constructed transmission precoding matrix. Yet, in case that a size of a codebook constructed by the precoding matrix corresponding to the fed back PMI is small, a quantization error occurs. Hence, although the transmission precoding matrix is constructed by using only the orthogonal matrices of the fed back precoding matrix, there exist significant amount of interference on the corresponding UE, thereby degrading the reception performance of the corresponding UE.

Hence, the present invention intends to propose a feedback scheme in the scheduling/beamforming method to improve the aforementioned problem with a relatively small overhead.

First Embodiment

Specifically, in the present invention, a total PMI is divided into a plurality of subsets, a UE designates a specific subset to inform a neighboring cell of a preferred PMI to be used by the neighboring cell. And, each of the PMIs in the specific subset is individually informed of whether it is a preferred PMI using a bitmap indicator. Preferably, the precoding matrices in the subset can be constructed by vectors orthogonal to each other.

According to the present invention, since scheduling flexibility of a neighboring cell increases as the PMI capable of being used by the neighboring cell is more designated, numbers of giving a feedback on the PMI can be configured in advance. In particular, in case of selecting more than M number of PMIs or a specific M number of PMIs among N number of PMIs in a subset, it is able to indicate the number of giving a feedback on the PMI via a selected PMI indicator of a bit size smaller than N bit, which is bitmap information.

The proposed scheme of the present invention is explained in detail with reference to Table 1. The following Table 1 indicates a codebook for 4 Tx antennas in LTE system.

TABLE 1

| Codebook index | $u_n$ | Number of layers $\upsilon$ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |

TABLE 1-continued

| Codebook index | $u_n$ | Number of layers $v$ | | | |
|---|---|---|---|---|---|
| | | 1 | 2 | 3 | 4 |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In the 4 Tx codebook in Table 1, a rank 1 PMI of total 16 is divided into 4 subsets. In particular, precoding matrices in the subsets are orthogonal to each other. For instance, a first subset is constructed by a $PMI_0$, a $PMI_2$, a $PMI_8$, and a $PMI_{10}$ and a second subset is constructed by $PMI_1$, a $PMI_3$, a $PMI_9$, and a $PMI_{11}$. And, a third subset is constructed by a $PMI_4$, a $PMI_5$, a $PMI_6$, and a $PMI_7$ and a fourth subset is constructed by $PMI_{12}$, a $PMI_{13}$, a $PMI_{14}$, and a $PMI_{15}$.

In order to inform a PMI wished to be used by a neighboring cell, a UE designates a specific subset among the first subset to the fourth subset using a subset indicator and informs the 4 PMIs in the specific subset of whether a corresponding PMI is a PMI preferred by the neighboring cell using a 4-bit size bitmap indicator.

Or, a feedback scheme designating 2 among 4 PMIs can be performed by a 3-bit size selected PMI indicator indicating a combination of a selected PMI of $_4C_2=6$.

In this case, the subset indicator designating a subset and PMI selection information in the subset can be fed back simultaneously or separately.

Moreover, as an example of a modified form of the scheme proposed by the present invention, there is a scheme that a UE informs of PMIs wished to be used by a cooperative cell in a cooperative scheduling/beamforming method. First of all, the scheme divides the PMIs in the codebook into a tree structure, designates a specific sub-tree, and informs PMIs in the corresponding sub-tree of whether the PMI is a PMI preferred by the cooperative cell. According to the proposed scheme, feedback information for designating a sub-tree and PMI selection information in the sub-tree can be fed back simultaneously or separately.

Meanwhile, the UE configured to perform a CSI feedback in the closed loop MIMO mode gives a feedback on a transmission rank and a transmission PMI, which are wished to be used in case that a data is transmitted to a serving cell, moreover, the UE simultaneously gives a feedback on a CQI value indicating reception quality capable of being obtained in case that an eNode B transmits a data using the fed back transmission rank and the transmission PMI.

Although the CQI value can be converted into a reception SINR value of a signal transmitted from an eNode B, a CQI index plays a role in designating a transmission data rate in a reference resource in which a CQI is calculated in a manner that the CQI index is mapped to a modulation order and a code rate in LTE system as shown in Table 2.

TABLE 2

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Referring to Table 2, in case of receiving a packet with a corresponding data rate on which the modulation order and the code rate are reflected in the reference resource, the UE selects a CQI index satisfying a packet error rate 10% and gives a feedback on the CQI index.

The UE configured to perform a feedback for a CoMP transmission in a cell boundary area gives a feedback on the transmission rank and the transmission PMI wished to be used in case of transmitting a data to a serving cell. In this case, the UE designates a specific subset to inform of the PMI wished to be used by a neighboring cell and gives a feedback on the PMI of the neighboring cell for the PMIs in the subset using a bitmap indicator or a selected PMI indicator. In the first embodiment of the present invention, the CQI index fed back together with the PMI is selected and fed back by the following 1) to 3) scheme.

1) As a first proposed scheme of the first embodiment of the present invention, assume a case that a serving cell transmits a data using the fed back transmission rank of the serving cell and the PMI of the serving cell and a case that a neighboring cell transmits a signal using one PMI or the PMI determined by a combination of the fed back PMIs wished to be used by the neighboring cell. In this case, if a packet is received with a specific data rate in the reference resource, a UE selects a CQI index corresponding to the specific data rate to satisfy a packet error rate 10%.

2) As a second proposed scheme of the first embodiment of the present invention, assume that there is no interference from a cooperative cell while the serving cell transmits a data using the fed back transmission rank of the serving cell and the PMI of the serving cell. In this case, if a packet is received with a specific data rate in the reference resource, the UE selects a CQI index corresponding to the specific data rate to satisfy a packet error rate 10% and gives a feedback on the CQI index. Naturally, it can be assumed that a PMI subset for the cooperative cell is determined.

In this case, as a reference of selecting a PMI wished to be used by the cooperative cell, the UE selects a corresponding PMI as the PMI of the cooperative cell in case that an anticipated CQI index satisfying the packet error rate 10% is not less than a preset threshold value compared to the fed back CQI index under an assumption that the cooperative cell uses a specific PMI (in the PMI subset).

For instance, if it is assumed that the fed back CQI index is defined by $CQI_{feedback}$ and the cooperative cell transmits a signal using a $PMI_i$, if the CQI index satisfying the packet error rate 10% is defined by a $CQI_i$, the UE selects a $PMI_i$ satisfying '$CQI_{feedback} - CQI_i \leq \Delta$' and reports the $PMI_i$ as the Recommended PMI of the cooperative cell. In case that a neighboring eNode B uses the Recommended PMI of the cooperative cell reported by the UE, the serving eNode B can transmit a data to the corresponding UE with a data rate corresponding to ($CQI_{feedback} - \Delta$).

3) As a third proposed scheme of the first embodiment of the present invention, assume that there exist a random interference from the cooperative cell while the serving cell transmits a data using the fed back transmission rank of the serving cell and the PMI of the serving cell. In this case, if a packet is received with a specific data rate in the reference resource, the UE selects a CQI index corresponding to the specific data rate to satisfy a packet error rate 10% and gives a feedback on the CQI index. Naturally, it can be assumed that a PMI subset for the cooperative cell is determined.

In this case, as a reference of selecting a PMI wished to be used by the cooperative cell, the UE selects a corresponding PMI as the PMI of the cooperative cell in case that an anticipated CQI index satisfying the packet error rate 10% is greater than a preset threshold value compared to the fed back CQI index under an assumption that the cooperative cell uses a specific PMI.

For instance, if it is assumed that the fed back CQI index is defined by $CQI_{feedback}$ and the cooperative cell transmits a signal using a $PMI_i$, if the CQI index satisfying the packet error rate 10% is defined by a $CQI_i$, the UE selects a $PMI_i$ satisfying '$CQI_{feedback} - CQI_i \geq \Delta$' and reports the $PMI_i$ as the Recommended PMI of the cooperative cell. In case that the cooperative cell uses the Recommended PMI, the serving cell can transmit a data to the corresponding UE with a data rate corresponding to ($CQI_{feedback} + \Delta$).

In the aforementioned 2) and 3), it is assumed that it is arranged to be mapped to a higher data rate as the CQI index increases as shown in Table 2. And, the threshold value $\Delta$ can be promised in advance between the UE and the eNode B via an RRC signaling.

In the proposed scheme 1) to 3), in case that the cooperative cell performs an interference reduction operation using the recommended PMI in the reference resource in which the CQI index is calculated, the UE can calculate the CQI index in a manner of assuming that there exist interference by a signal transmitted using such a fixed precoder as a CRS, which is a cell-specific reference signal of the cooperative cell.

FIG. 9 is a flowchart for a UE to report channel state information according to a first embodiment of the present invention. In particular, it is assumed that FIG. 9 uses the aforementioned scheme 2) to calculate a CQI index.

Referring to FIG. 9, a UE receives a threshold value $\Delta$ from a serving cell [S901]. In this case, the threshold value $\Delta$ can be received via an RRC signaling.

Subsequently, the UE determines a transmission rank and a PMI of the serving cell [S902]. In this case, a PMI subset for a cooperative cell can be determined.

Subsequently, the UE assumes that there is no interference from the cooperative cell while transmitting a data using a transmission rank of the serving cell to which the serving cell is fed back and a PMI of the serving cell and if a packet is received with a specific data rate in a reference resource, selects a CQi index $CQI_{feedback}$ corresponding to the specific data rate to satisfy a packet error rate 10% [S903].

And, the UE determines a Recommended PMI in the PMI subset, which is wished to be used by the cooperative cell, using the threshold value $\Delta$ and the $CQI_{feedback}$ [S904]. Specifically, if it is assumed that the cooperative cell transmits a signal using a $PMI_i$, if the CQI index satisfying the packet error rate 10% is defined as a $CQI_i$, the UE selects the $PMI_i$ satisfying '$CQI_{feedback} - CQI_i \leq \Delta$' and determines the $PMI_i$ as the Recommended PMI of the cooperative cell.

And, in this case, the Recommended PMI for the cooperative cell designates a specific subset among a first subset to a fourth subset using a subset indicator and the Recommended PMI is configured to designate whether the PMI is a PMI wished to be used by an neighboring cell using a bitmap indicator of 4-bit size for the four PMIs in the subset.

Lastly, the UE gives a feedback on feedback information on the serving cell and feedback information on the cooperative cell to the serving cell [S905].

Second Embodiment

A second embodiment of the present invention is a variation of the first embodiment. The second embodiment can consider a scheme of informing of an impact of data reception performance of the UE in case that the UE uses PMIs wished to be used by the cooperative cell and a corresponding PMI in the CoMP CS/CB method. Specifically, as mentioned earlier, first of all, precoding matrices in a codebook are divided into a plurality of subsets, in case that the cooperative cell transmits a signal using a feedback designating a specific subset and a PMI in the corresponding subset, the corresponding UE gives a feedback on change portion of the CQI index capable of satisfying a 10% packet error rate.

A) As a first proposed scheme of the second embodiment, first of all, the UE determines a transmission rank and a PMI of the serving cell. In this case, a PMI subset for the cooperative cell can be determined.

Subsequently, the UE assumes that there is no interference form the cooperative cell while transmitting a data using the transmission rank of the serving cell to which the serving cell is fed back and the PMI of the serving cell, if the CQI index receives a packet with a data rate to which the CQI index is mapped in the reference resource, the UE selects the CQI index, i.e., the $CQI_{feedback}$ to satisfy the packet error rate 10% and gives a feedback on the CQI index.

And, in case that the cooperative cell transmits a signal using a $i^{th}$ PMI, i.e., a $PMI_i$ in the determined subset, the UE obtains the change portion '($CQI_{feedback} - CQI_i$)=$\Delta_i$' in a manner of calculating the CQI index, i.e., $CQI_i$ satisfying the packet error rate 10% and gives a feedback on the CQI index.

B) As a second proposed scheme of the second embodiment of the present invention, if it is assumed that there exist a random interference while a data is transmitted using a transmission rank of the serving cell to which the serving cell is fed back and a PMI of the serving cell, if a packet is received with a data rate to which a CQI index is mapped in a reference resource, the UE selects the CQI index, i.e., the $CQI_{feedback}$ to satisfy the packet error rate 10% and gives a feedback on the CQI index.

And, in case that the cooperative cell transmits a signal using a $i^{th}$ PMI in the determined subset, the UE obtains the change portion '($CQI_i - CQI_{feedback}$)=$\Delta_i$' in a manner of calculating the CQI index, i.e., $CQI_i$ satisfying the packet error rate 10% and gives a feedback on the CQI index.

According to the aforementioned proposed schemes A) and B), the UE calculates the CQI change portion $\Delta_i$ for all PMIs in the designated subset and gives a feedback on the CQI change portion.

Figure 10:
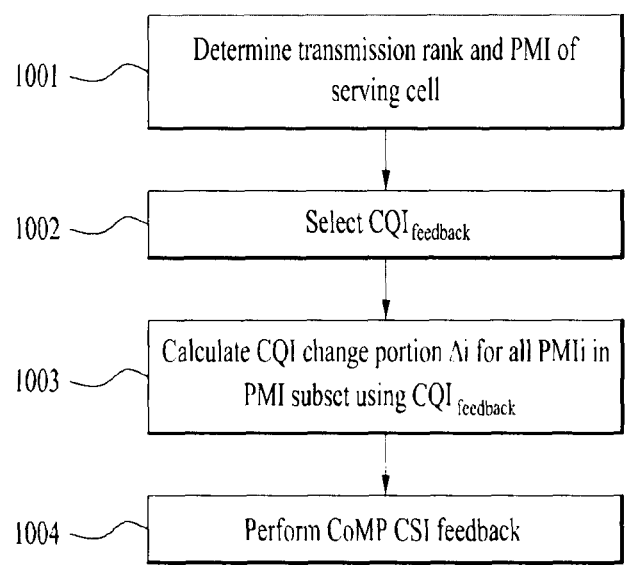
FIG. 10 is a flowchart for a UE to report channel state information according to a second embodiment of the present invention.

FIG. 10 is a flowchart for a UE to report channel state information according to a second embodiment of the present invention. In particular, it is assumed that FIG. 10 uses the aforementioned scheme A) to calculate a CQI index.

Referring to FIG. 10, first of all, the UE determines a transmission rank and a PMI of the serving cell [S1001]. In this case, a PMI subset for a cooperative cell can be determined.

Subsequently, the UE assumes that there is no interference from the cooperative cell while transmitting a data using a transmission rank of the serving cell to which the serving cell is fed back and a PMI of the serving cell and if a packet is received with a data rate to which a CQI index is mapped in a reference resource, the UE selects a $CQI_{feedback}$ to satisfy a packet error rate 10% [1002].

Subsequently, if the cooperative cell transmits a signal using $i^{th}$ PMI in the determined PMI subset, the UE calculates CQI index $CQI_i$ satisfying a packet error rate 10% [1003]. In particular, the UE calculates the CQI change portion $\Delta_i$ for all PMIs in the determined subset.

Lastly, the UE gives a feedback on feedback information on the serving cell and feedback information on the cooperative cell to the serving cell [S1004].

Third Embodiment

In the CoMP CS/CB method, the UE can give a feedback on a PMI wished to be used by the cooperative cell. On the contrary, according to the present invention, it is also possible to consider a scheme that the cooperative cell informs the interfered UE of the PMI currently using and the UE reports a channel status in consideration of the PMI.

In this case, when the serving cell informs the UE interfered from the cooperative cell of the PMI used by the cooperative cell, the serving cell designates a PMI subset first and can inform the UE of the PMI used by the cooperative cell in the corresponding subset via a bitmap indicator or a selected PMI indicator.

If it is explained with an example of the 4 Tx antenna codebook of LTE system shown in Table 1, first of all, 16 rank 1 PMIs are divided into 4 subsets and each subset is configured to have 4 PMIs. Subsequently, the serving cell designates a subset using a subset indicator of 2-bit size and informs the UE of which PMIs are used by the cooperative cell in the corresponding subset using the bitmap indicator or the selected PMI indicator.

In particular, the subset indicator and the bitmap indicator (or selected PMI indicator) are delivered to inform the UE of the PMI used by the cooperative cell. The indicators are configured in advance via an RRC signaling or can be transmitted in a manner of being included in a PDCCH request message for requesting an aperiodic CQI report. And, the subset indicator for designating a subset and PMI selection information in the subset can be fed back simultaneously or separately.

And, the UE transmits a data using a transmission rank of the serving cell to which the serving cell is fed back and the PMI of the serving cell. And, the cooperative cell assumes that a data is transmitted using one PMI or the PMI determined by a combination of the PMIs delivered via the aforementioned indicator. If a packet is received with a specific transmission data rate in the reference resource, the UE selects the CQI index corresponding to the specific transmission rate to satisfy the packet error rate 10%.

Figure 11:
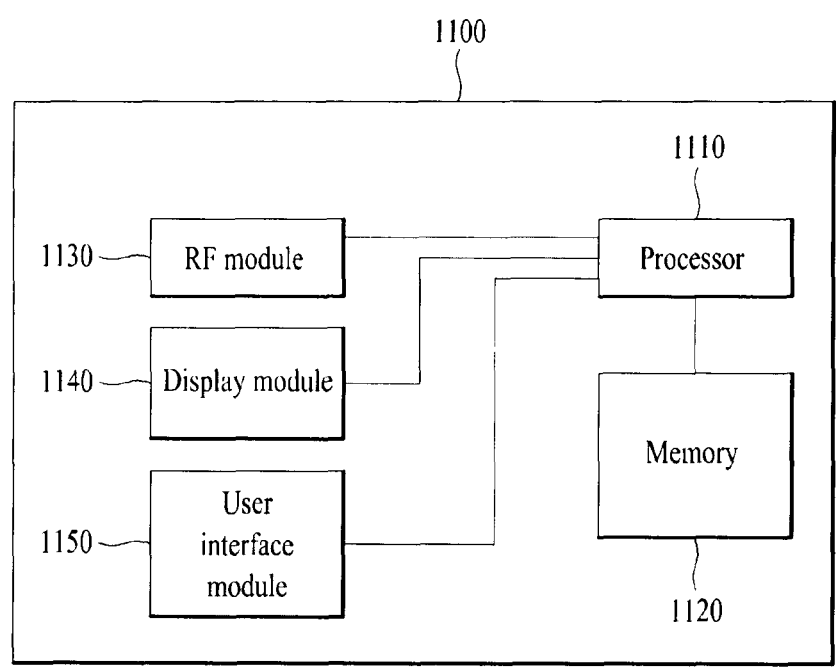
FIG. 11 is a block diagram of an example for a communication device according to one embodiment of the present invention.

FIG. 11 is a block diagram of an example for a communication device according to one embodiment of the present invention.

Referring to FIG. 11, a communication device 1100 may include a processor 1110, a memory 1120, an RF module 1130, a display module 1140, and a user interface module 1150.

Since the communication device 1100 is depicted for clarity of description, prescribed module(s) may be omitted in part. The communication device 1100 may further include necessary module(s). And, a prescribed module of the communication device 1100 may be divided into subdivided modules. A processor 1110 is configured to perform an operation according to the embodiments of the present invention illustrated with reference to drawings. In particular, the detailed operation of the processor 1110 may refer to the former contents described with reference to FIG. 1 to FIG. 10.

The memory 1120 is connected with the processor 1110 and stores an operating system, applications, program codes, data, and the like. The RF module 1130 is connected with the processor 1110 and then performs a function of converting a baseband signal to a radio signal or a function of converting a radio signal to a baseband signal. To this end, the RF module 1130 performs an analog conversion, amplification, a filtering, and a frequency up conversion, or performs processes inverse to the former processes. The display module 1140 is connected with the processor 1110 and displays various kinds of informations. And, the display unit 1140 can be implemented using such a well-known component as an LCD (liquid crystal display), an LED (light emitting diode), an OLED (organic light emitting diode) display and the like, by which the present invention may be non-limited. The user interface module 1150 is connected with the processor 1110 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by an eNode B may be performed by an upper node of the eNode B in some cases. In particular, in a network constructed with a plurality of network nodes including an eNode B, it is apparent that various operations performed for communication with a user equipment can be performed by an eNode B or other networks except the eNode B. 'eNode B (eNB)' may be substituted with such a terminology as a fixed station, a Node B, a base station (BS), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of reporting channel state information in a multi-cell cooperative wireless communication system and apparatus therefore are described with reference to examples applied to 3GPP LTE system, it may be applicable to various kinds of wireless communication systems as well as to the 3GPP LTE system.

What is claimed is:

1. A method of transmitting channel state information, which is transmitted by a user equipment in a multi-cell cooperative wireless communication system, comprising the steps of:
   determining a PMI for a serving cell among a plurality of Precoding Matrix Indexes (PMIs);
   constructing a PMI information for a cooperative cell based on the PMI for the serving cell; and
   transmitting the PMI for the serving cell and the PMI information for the cooperative cell to the serving cell,
   wherein a plurality of the PMIs are distinguished by a plurality of PMI subsets, wherein PMIs contained in each of a plurality of the PMI subsets are orthogonal to each other, wherein the PMI information for the cooperative cell comprises a first indicator indicating one of a plurality of the PMI subsets as a PMI subset for the cooperative cell and a second indicator indicating at least one of PMIs in the indicated PMI subset as a PMI for the cooperative cell.

2. The method of claim 1, the PMI constructing step for the cooperative cell, comprising the steps of:
   determining the PMI subset for the cooperative cell;
   determining a first CQI index under an assumption that there is no interference from the cooperative cell while a signal is transmitted by the serving cell using the PMI for the serving cell; and
   determining the PMI for the cooperative cell in the PMI subset using the first CQI index and a preset threshold value ($\Delta$).

3. The method of claim 2, wherein the PMI for the cooperative cell satisfies a following Formula 1, $$\text{The first CQI index} - CQI_i \leq \Delta, \qquad \text{<Formula 1>}$$

wherein, the $CQI_i$ is a CQI index, if it is assumed that the cooperative cell transmits a signal using a $PMI_i$ in the PMI subset.

4. The method of claim 1, the PMI constructing step for the cooperative cell, comprising the steps of:
   determining the PMI subset for the cooperative cell;
   determining a second CQI index under an assumption that there exist a random interference from the cooperative cell while a signal is transmitted by the serving cell using the PMI for the serving cell; and
   determining the PMI for the cooperative cell in the PMI subset using a first CQI index and a preset threshold value ($\Delta$).

5. The method of claim 4, wherein the PMI for the cooperative cell satisfies a following Formula 2, $$CQI_i - \text{the second CQI index} \geq \Delta, \qquad \text{<Formula 2>}$$

wherein, the $CQI_i$ is a CQI index, if it is assumed that the cooperative cell transmits a signal using a $PMI_i$ in the PMI subset.

6. The method of claim 2 or claim 4, wherein the threshold value ($\Delta$) is set via an upper layer signal from the serving cell.

7. A user equipment in a multi-cell cooperative wireless communication system, comprising:
   a processor configured to determine a PMI for a serving cell among a plurality of Precoding Matrix Indexes (PMIs) and configured to construct a PMI information for a cooperative cell based on the PMI for the serving cell; and
   a transmitting module configured to transmit the PMI for the serving cell and the PMI information for the cooperative cell to the serving cell,
   wherein a plurality of the PMIs are distinguished by a plurality of PMI subsets, wherein PMIs contained in each of a plurality of the PMI subsets are orthogonal to each other, wherein the PMI information for the cooperative cell comprises a first indicator indicating one of a plurality of the PMI subsets as a PMI subset for the cooperative cell and a second indicator indicating at least one of PMIs in the indicated PMI subset as a PMI for the cooperative cell.

8. The user equipment of claim 7, wherein the processor is configured to determine the PMI subset for the cooperative cell, configured to determine a first CQI index under an assumption that there is no interference from the cooperative cell while a signal is transmitted by the serving cell using the PMI for the serving cell, and configured to determine the PMI for the cooperative cell in the PMI subset using the first CQI index and a preset threshold value ($\Delta$).

9. The user equipment of claim 8, wherein the PMI for the cooperative cell satisfies a following Formula 1, $$\text{The first CQI index} - CQI_i \leq \Delta, \qquad \text{<Formula 1>}$$

wherein, the $CQI_i$ is a CQI index, if it is assumed that the cooperative cell transmits a signal using a $PMI_i$ in the PMI subnet subset.

10. The user equipment of claim 7, wherein the processor is configured to determine the PMI subset for the cooperative cell, configured to determine a second CQI index under an assumption that there exist a random interference from the cooperative cell while a signal is transmitted by the serving cell using the PMI for the serving cell, and configured to determine the PMI for the cooperative cell in the PMI subset using a first CQI index and a preset threshold value ($\Delta$).

11. The user equipment of claim 10, wherein the PMI for the cooperative cell satisfies a following Formula 2, $$CQI_i - \text{the second CQI index} \geq \Delta, \quad \text{<Formula 2>}$$

wherein, the $CQI_i$ is a CQI index, if it is assumed that the cooperative cell transmits a signal using a $PMI_i$ in the PMI subnet subset.

12. The user equipment of claim 8 or claim 10, wherein the threshold value ($\Delta$) is set via an upper layer signal from the serving cell.

* * * * *